(12) United States Patent
Rainisto

(10) Patent No.: US 7,777,728 B2
(45) Date of Patent: Aug. 17, 2010

(54) MOBILE COMMUNICATION TERMINAL

(75) Inventor: Roope Rainisto, Helsinki (FI)

(73) Assignee: Nokia Corporation, Espoo (FI)

( * ) Notice: Subject to any disclaimer, the term of this patent is extended or adjusted under 35 U.S.C. 154(b) by 1082 days.

(21) Appl. No.: 11/384,206

(22) Filed: Mar. 17, 2006

(65) Prior Publication Data

US 2007/0216658 A1 Sep. 20, 2007

(51) Int. Cl.
*G06F 3/041* (2006.01)
(52) U.S. Cl. .................. 345/173; 345/169; 345/168
(58) Field of Classification Search ............... 345/156, 345/168, 169, 172–174, 178, 179
See application file for complete search history.

(56) References Cited

U.S. PATENT DOCUMENTS

| | | | | |
|---|---|---|---|---|
| 5,748,512 A | * | 5/1998 | Vargas | 708/142 |
| 6,614,422 B1 | | 9/2003 | Rafii et al. | |
| 2004/0001048 A1 | * | 1/2004 | Kraus et al. | 345/173 |
| 2004/0046744 A1 | * | 3/2004 | Rafii et al. | 345/168 |
| 2004/0140956 A1 | * | 7/2004 | Kushler et al. | 345/168 |
| 2004/0155869 A1 | * | 8/2004 | Robinson et al. | 345/168 |
| 2006/0028450 A1 | * | 2/2006 | Suraqui | 345/169 |
| 2006/0038789 A1 | * | 2/2006 | Ban et al. | 345/169 |

* cited by examiner

*Primary Examiner*—Amr Awad
*Assistant Examiner*—John Morris
(74) *Attorney, Agent, or Firm*—Alston & Bird LLP

(57) ABSTRACT

It is presented a text input method for an electronic apparatus with a touch sensitive display, the apparatus comprising a user interface, wherein a virtual keyboard is displayed on the display so as to facilitate input of an intended character for a user by touching keys of the virtual keyboard with a pointer, wherein the intended character is determined by considering: a plurality of candidate characters, the plurality of candidate characters being determined with regard to a raw distance, the raw distance being a distance between a first position, the first position being a position of a detected touch of the pointer, and a position corresponding to a character, and linguistic probabilities of each character of the plurality of candidate characters being an intended character. A corresponding electronic apparatus and computer program product are also presented.

17 Claims, 6 Drawing Sheets

MOBILE COMMUNICATION TERMINAL

FIELD OF THE INVENTION

Embodiments of the present invention generally relates to electronic equipment capable of text input, and more particularly to a text input method for an electronic apparatus having a user interface with a touch sensitive display.

BACKGROUND OF THE INVENTION

Apparatuses with touch-sensitive display screens often provide a virtual key-board feature in the user interface to facilitate text input. This works by displaying a virtual keyboard, often resembling a real-life keyboard, on the display screen. By tapping with a writing tool on individual buttons or keys of the virtual keyboard, the user may input successive characters which aggregate to a text input shown in a text input field on the display screen.

Since text input with a writing tool on a touch-sensitive display screen by nature will be slower and more error prone than manual input on a hardware (physical) keyboard, it is generally desired to improve the accuracy and input speed. One approach in this regard known in the art is the provision of word completion functionality in the user interface for automatic presentation of full word candidates to what the user has currently inputted in the form of a partial word.

For instance, if the user writes "wo" by tapping on the "w" key and then the "o" key of the virtual keyboard, the word completion functionality can predict full word candidates such as "word", "world" and "wormhole" and present them on the display screen in a selectable manner. A desired one of these candidates may be selected by the user by tapping on it, and the full word thus selected will automatically replace the current partial word input on the display screen.

While word completion functionality certainly has its benefits, some problems are associated therewith. In more particular, since the apparatus involved will typically be a small portable device such as a mobile terminal or a pocket computer, the available display screen space will be a limited resource. Thus, displaying multiple full word candidates anywhere in the user interface may potentially block other relevant information to be displayed (such as actual application contents).

Another problem with this input method is that the user is dependent on what words are in the dictionary of the device. Another problem is that the user constantly has to check what suggestions are provided to see if there is a matching word, whereby the user has to concentrate partly on finding the correct characters with the stylus and partly on checking suggested words, leading to inefficient typing. Moreover, this solution requires that dictionaries are stored locally in the device for all input languages that need to be supported, which requires a significant amount of storage space.

Consequently, there is a need for a novel and improved method for a user to efficiently input text on a device with a touch sensitive display.

SUMMARY OF THE INVENTION

In view of the above, an objective of certain embodiments of the invention is to solve or at least reduce the problems discussed above.

According to a first aspect of the invention there has been provided a text input method for an electronic apparatus with a touch sensitive display, the apparatus comprising a user interface, wherein a virtual keyboard is displayed on the display so as to facilitate input of an intended character for a user by touching keys of the virtual keyboard with a pointer, wherein the intended character is determined by considering: a plurality of candidate characters, the plurality of candidate characters being determined with regard to a raw distance, the raw distance being a distance between a first position, the first position being a position of a detected touch of the pointer, and a position corresponding to a character, and linguistic probabilities of each character of the plurality of candidate characters being an intended character. This method provides a novel and inventive way to reduce the risk of the user making mistakes when using a virtual keyboard to enter text.

The plurality of candidate characters may be determined also with regard to a direction of movement of the pointer. This provides a better way to predict the intended character.

The text input method may comprise the steps of: detecting a touch on the touch sensitive display at a first position, calculating a tap distance and a tap direction between the first position and a second position, the second position being a position of a previously detected touch position, associating a key candidate area, the candidate area having a predetermined spatial extent, being associated with the first position, creating a candidate list of characters, each character in the candidate list having at least part of its respective key area overlapping the candidate area, for the each character in the candidate list, determining a raw distance between a position corresponding to the each character and the first position, determining a probability value for the each character in the candidate list, the probability value being the linguistic probability of the each character, for the each character in the candidate list, calculating a weighted distance, the weighted distance being calculated using the raw distance and the probability value, and determining the intended character, the intended character being determined as the character in the candidate list with a smallest weighted distance.

The step of determining a probability value may involve determining a probability value based on at least one previously input character. Previously input characters provide a readily available base for linguistic probabilities of new character entries.

The step of determining a probability value may involve determining a probability value based on at least one previously input character and an input language. Using an input language enhances the accuracy of the method, as linguistic probabilities for the same letter combinations differ between languages.

The step of associating a candidate area with the first position may involve determining the candidate area with consideration to the tap distance and the tap direction. Using the tap direction allows a more controlled candidate area, resulting in a better candidate list, eliminating highly unlikely candidates.

The step of associating a candidate area with the first position may involve determining the candidate area, the candidate area being relatively longer along a first axis and relatively shorter along a second axis, the first axis being parallel to the tap direction and the second axis being perpendicular to the first axis. The candidate area may be of an elliptical or a teardrop shape. This improves accuracy, as there is a larger probability of missing the intended character along the tap direction.

In the step of for the each character in the candidate list, calculating a weighted distance, the weighted distance may be proportional to both the raw distance and the difference between the constant one and the probability value.

The step of detecting a touch on the touch sensitive display at the first position may involve detecting a duration of the touch, and the method may comprise the further step, after the step of determining an intended character, of: conditionally determining the intended character to be a character directly corresponding to the first position, the condition comprising at least that the touch has a duration being longer than a threshold duration. This allows the user to insist on the intended character being the character having the activation area of the first position. This may be particularly useful while entering passwords, web addresses, text in a language different from the input language, etc.

A second aspect of the present invention is an electronic apparatus comprising a user interface with a touch sensitive display, and a controller coupled to the display, the user interface including a virtual keyboard which is presentable on the display so as to facilitate input of an intended character for a user by touching keys of the virtual keyboard with a pointer, each key being associated with a respective key area, the user interface including a character selection functionality for determining an intended character, the controller being adapted for determining the intended character considering: a plurality of candidate characters, the plurality of candidate characters being based on a direction of movement of the pointer, and linguistic probabilities of each character of the plurality of candidate characters being an intended character. This electronic apparatus provides a novel and inventive way to reduce the risk of the user making mistakes when using a virtual keyboard to enter text.

The electronic apparatus may be in the form of a pocket computer. Virtual keyboards are commonly used in pocket computers and would benefit from increased text entry accuracy and speed.

The electronic apparatus may be in the form of a mobile terminal for a mobile telecommunications network. Virtual keyboards are commonly used in pocket computers and would benefit from increased text entry accuracy and speed.

A computer program product directly loadable into a memory of a processor, where the computer program product comprises program code for performing the method as defined in the first aspect when executed by the processor.

Other objectives, features and advantages of the present invention will appear from the following detailed disclosure, as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Embodiments of the present invention will now be described in more detail, reference being made to the enclosed drawings.

DETAILED DESCRIPTION OF PREFERRED EMBODIMENTS

The present invention now will be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
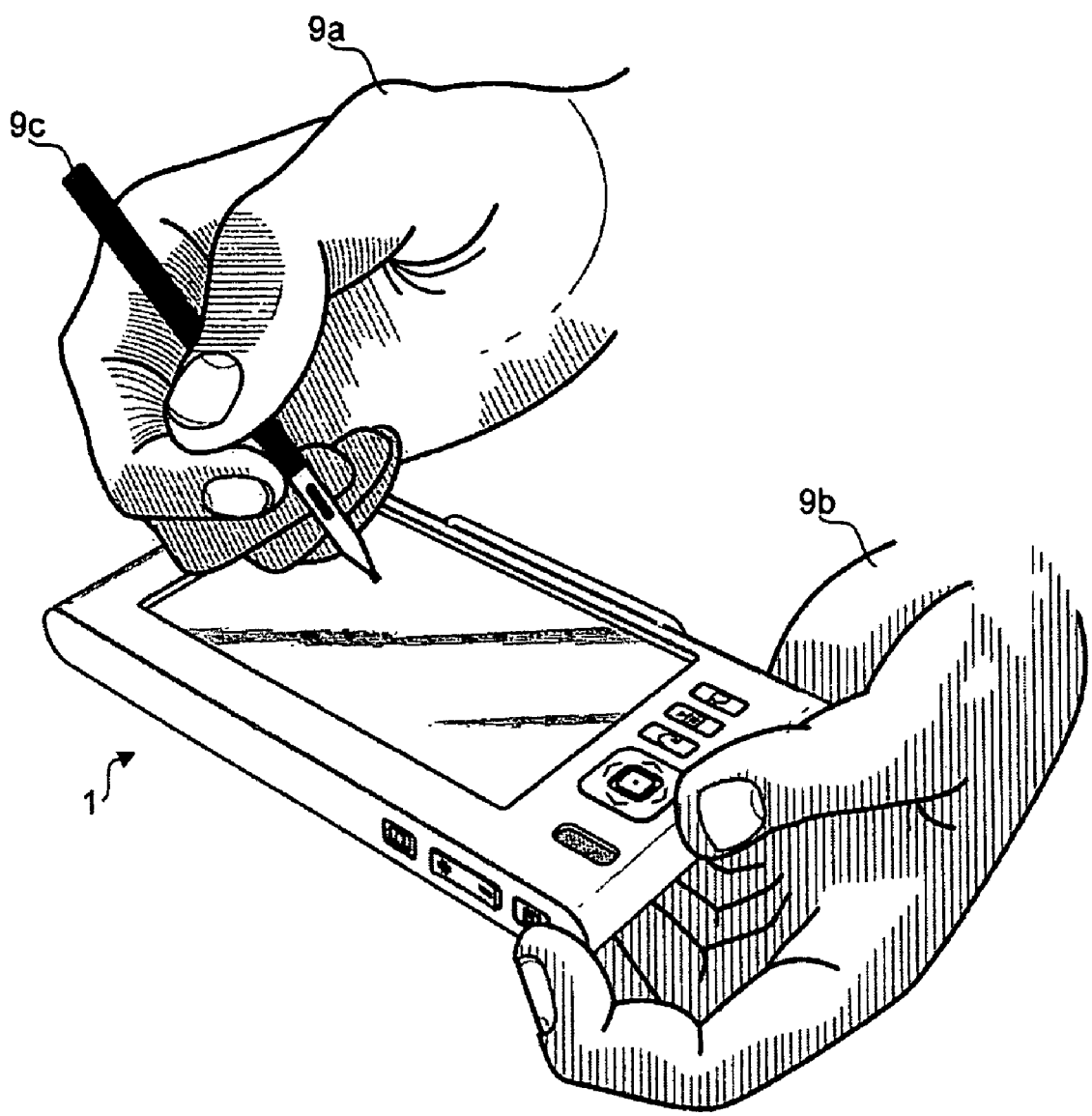
FIG. 1 is a perspective view of an electronic apparatus according to one embodiment, in the form of a pocket computer which is shown in a typical operating position in the hands of a user.
Figure 2:
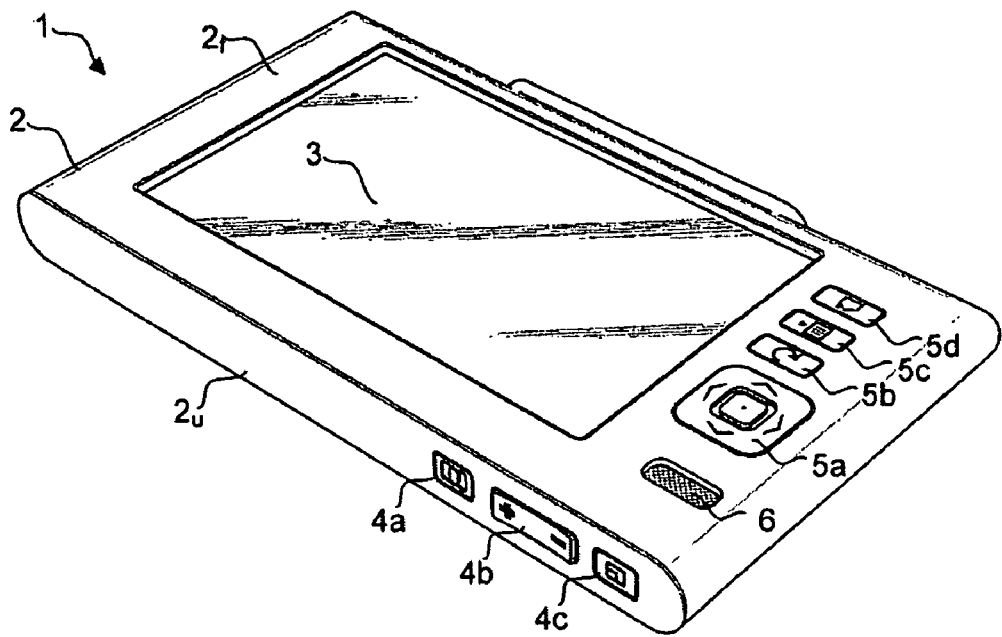
FIGS. 2 and 3 are different perspective views of the pocket computer of FIG. 1.
Figure 3:
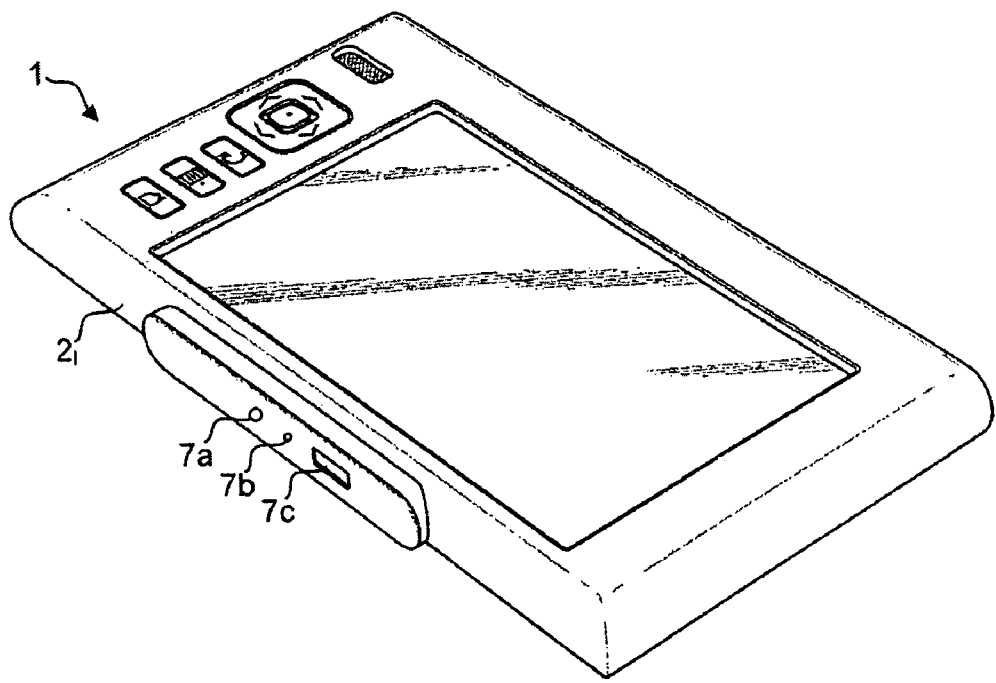

With reference to FIGS. 1 to 3, an electronic apparatus according to an embodiment of the present invention will now be described. The pocket computer 1 of the illustrated embodiment comprises an apparatus housing 2 and a relatively large touch-sensitive display screen 3 provided at a front side 2f of the apparatus housing 2. Next to the display screen 3 a plurality of hardware keys 5a-d are provided, as well as a speaker 6.

More particularly, key 5a is a five-way navigation key, i.e. a key which is depressible at four different peripheral positions to command navigation in respective orthogonal directions ("up", "down", "left", "right") among information shown on the display screen 3, as well as depressible at a center position to command selection among information shown on the display screen 3. Key 5b is a cancel key, key 5c is a menu or options key, and key 5d is a home key.

In addition, a second plurality of hardware keys 4a-c are provided at a first short side 2u of the apparatus housing 2. Key 4a is a power on/off key, key 4b is an increase/decrease key, and key 4c is for toggling between full-screen and normal presentation on the display screen 3.

At a second short side 21 of the apparatus housing 2, opposite to said first short side 2u, there are provided an earphone audio terminal 7a, a mains power terminal 7b and a wire-based data interface 7c in the form of a USB port.

Figure 5:
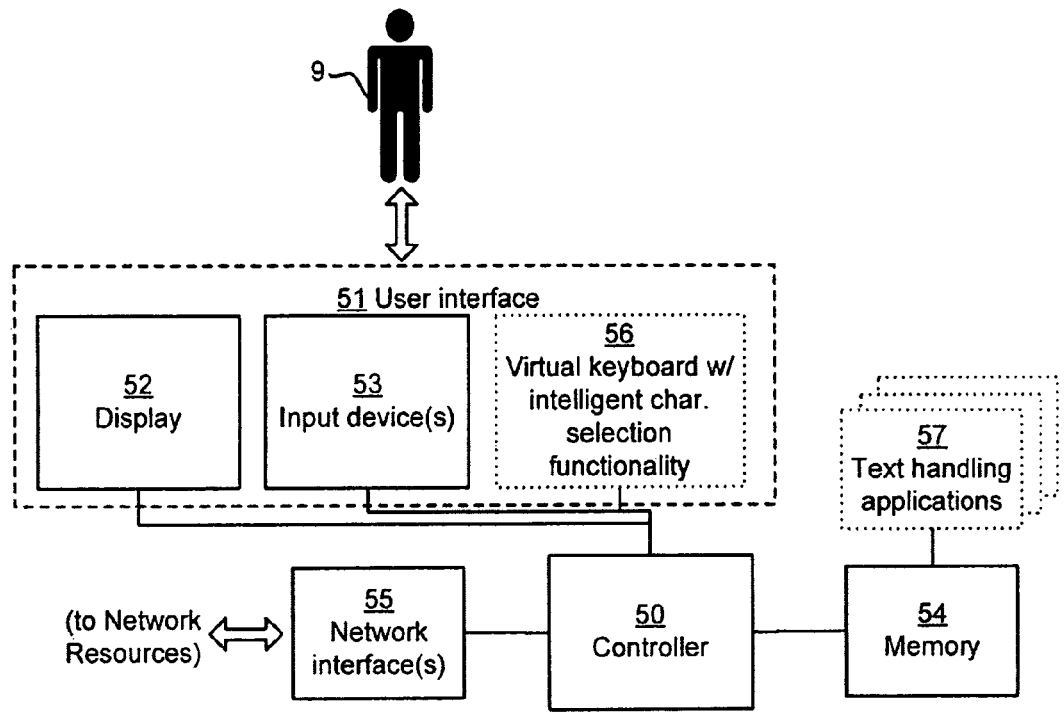
FIG. 5 is a schematic block diagram of the pocket computer according to the previous drawings.

Being touch-sensitive, the display screen 3 will act both as a visual output device 52 and as an input device 53, both of which are included in a user interface 51 to a user 9 (see FIG. 5). More specifically, as seen in FIG. 1, the user 9 may operate the pocket computer 1 by pointing/tapping/dragging with a pointer 9c such as a stylus or pen, held in one hand 9a, on the surface of the touch-sensitive display screen 3 and/or by actuating any of the hardware keys 4a-c, 5a-d (which also are included as input devices in the user interface 51) with the thumb and index finger of the other hand 9b. It is to be noted that a finger of the user may also be used as a pointer.

As seen in FIG. 5, the pocket computer 1 also has a controller 50 with associated memory 54. The controller is responsible for the overall operation of the pocket computer 1 and may be implemented by any commercially available CPU (Central Processing Unit), DSP (Digital Signal Processor) or any other electronic programmable logic device. The associated memory may be internal and/or external to the controller 50 and may be RAM memory, ROM memory, EEPROM memory, flash memory, hard disk, or any combination thereof. The memory 54 is used for various purposes by the controller 50, one of them being for storing data and program instructions for various pieces of software in the pocket computer 1. The software may include a real-time operating system, drivers e.g. for the user interface 51, as well as various applications.

At least some of these applications may be text handling applications 57, for instance in the form of a notes application (further shown in FIGS. 8, 9a, 9b), a messaging application (e.g. SMS, MMS, email), a contacts application, a word processing application, etc. To facilitate text input, the user interface 51 includes a virtual keyboard module 56 with intelligent character selection functionality, having the general purpose which has already been explained above. In addition to this, the user interface may include other text input means, such as a handwriting input module with a handwriting recognition engine.

To allow portable use, the pocket computer 1 has a rechargeable battery. The pocket computer also has at least one interface 55 for wireless access to network resources on at least one digital network. More detailed examples of this are given in FIG. 4. Here, the pocket computer 1 may connect to a data communications network 32 by establishing a wireless link via a network access point 30, such as a WLAN (Wireless Local Area Network) router. The data communications network 32 may be a wide area network (WAN), such as Internet or some part thereof, a local area network (LAN), etc. A plurality of network resources 40-44 may be connected to the data communications network 32 and are thus made available to the user 9 through the pocket computer 1. For instance, the network resources may include servers 40 with associated contents 42 such as www data, wap data, ftp data, email data, audio data, video data, etc. The network resources may also include other end-user devices 44, such as personal computers.

Figure 4:
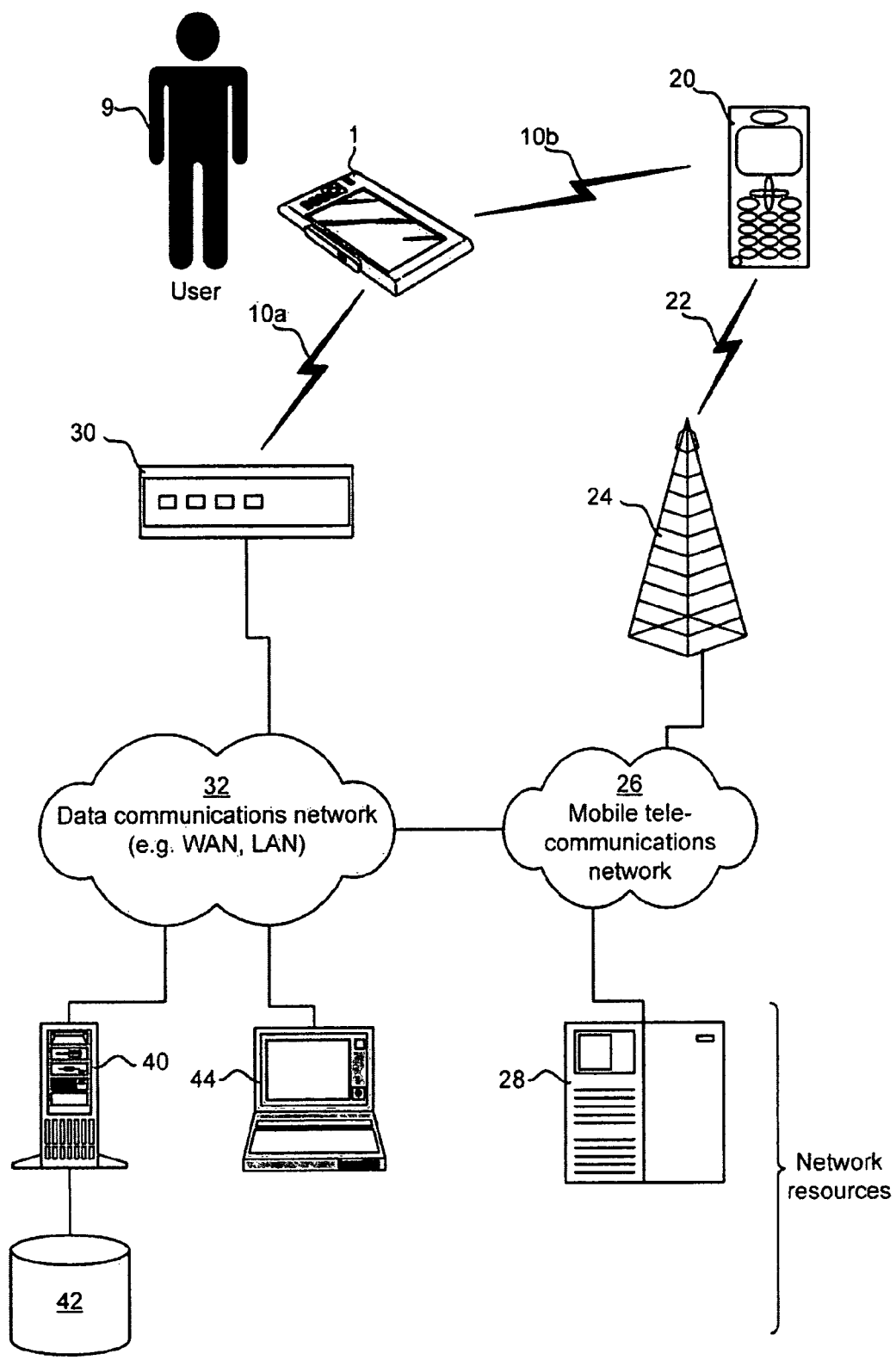
FIG. 4 illustrates a computer network environment in which the pocket computer of FIGS. 1-3 advantageously may be used for providing wireless access for the user to network resources and remote services.

A second digital network 26 is shown in FIG. 4 in the form of a mobile telecommunications network, compliant with any available mobile telecommunications standard such as GSM, UMTS, D-AMPS or CDMA2000. In the illustrated exemplifying embodiment, the user 9 may access network resources 28 on the mobile telecommunications network 26 through the pocket computer 1 by establishing a wireless link 10b to a mobile terminal 20, which in turn has operative access to the mobile telecommunications network 26 over a wireless link 22 to a base station 24, as is well known per se. The wireless links 10a, 10b may for instance be in compliance with Bluetooth™, WLAN (Wireless Local Area Network, e.g. as specified in IEEE 802.11), HomeRF, WIMAX or HIPERLAN. Thus, the interface(s) 55 will contain all the necessary hardware and software required for establishing such links, as is readily realized by a man skilled in the art.

Figure 6:
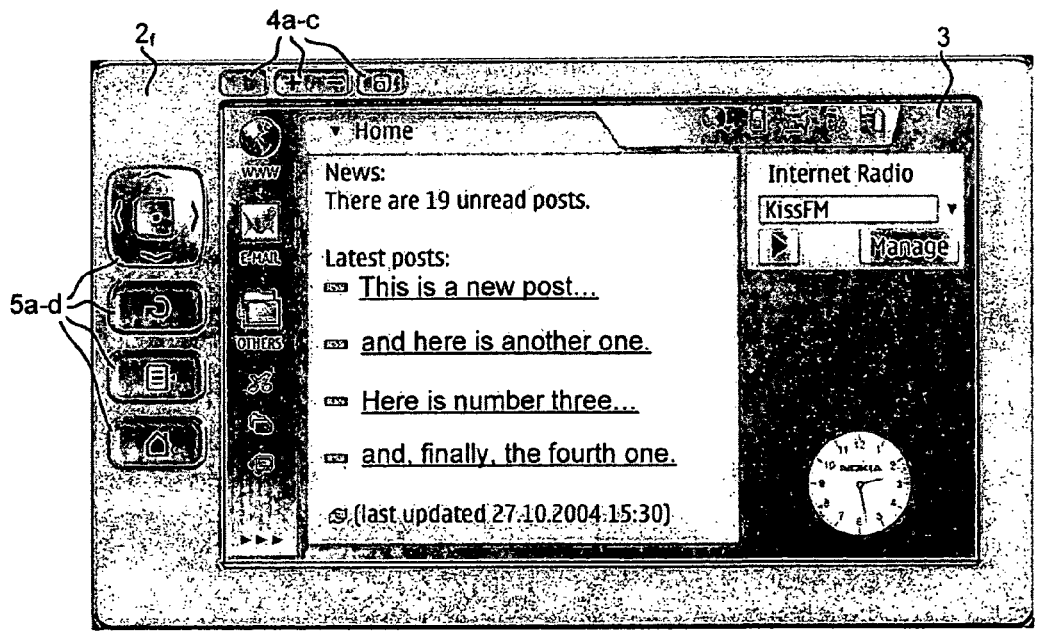
FIG. 6 is a front view of the pocket computer, demonstrating a typical display screen layout of its user interface.

FIG. 6 shows a front view of the pocket computer and indicates a typical display screen layout of its user interface. A typical disposition of the display screen layout, presenting a view of a home application (i.e., a start or base view that the user 9 may return to whenever he likes), is shown in more detail in FIG. 7. In FIG. 6, the hardware keys 5a-d are shown at their actual location to the left of the display screen 3 on the front surface 2f of the apparatus housing 2, whereas, for clarity reasons, the hardware keys 4a-c are illustrated as being located above the display screen 3 on the front surface 2f even while they actually are located at aforesaid first short side 2u (FIG. 2).

Figure 7:
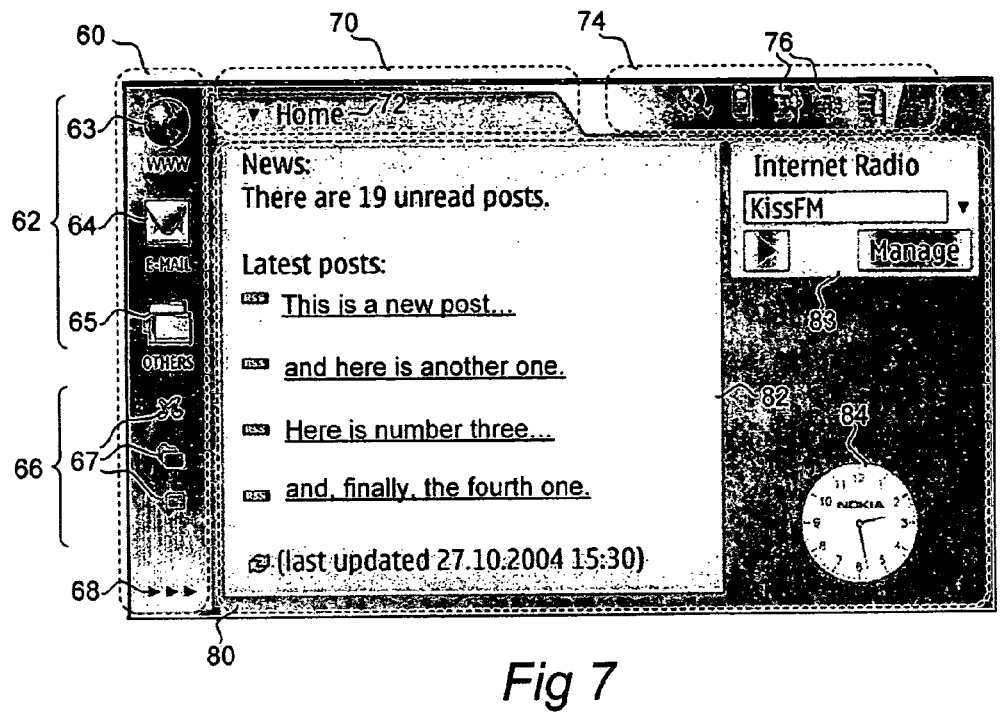
FIG. 7 illustrates a typical disposition of the display screen layout, including a home view.

With reference to FIG. 7, the layout of the display screen 3 is divided into four main areas: a task navigator 60, a title area 70, a status indicator area 74 and an application area 80.

Figure 8:
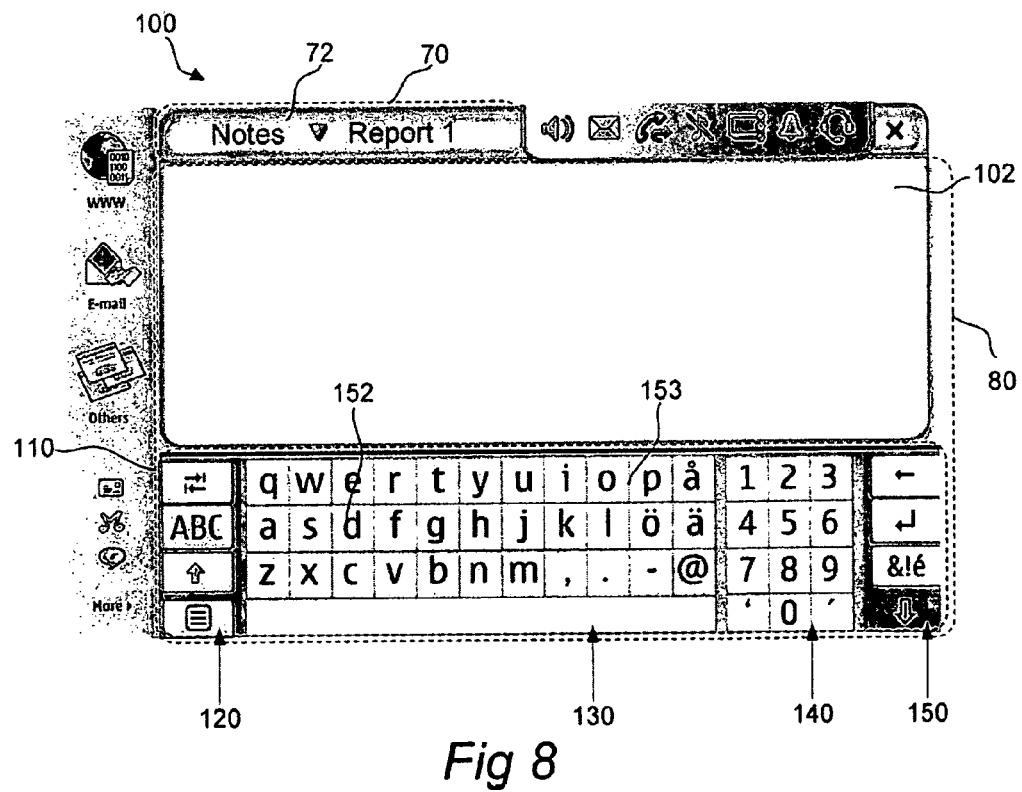
FIG. 8 illustrates a display screen layout for text input into a text handling application in the pocket computer.

The application area 80 is used by a currently active application to present whatever information is relevant and also to provide user interface controls such as click buttons, scrollable list, check boxes, radio buttons, hyper links, etc, which allow the user 9 to interact with the currently active application by way of the stylus 9c. One example of how a currently active application, in the form of a notes application, uses the application area 80 in this manner is shown in FIG. 8. A name or other brief description of the currently active application (e.g. the notes application) and a current file or data item (e.g. the currently open text file) is given at 72 in the title area 70 (e.g. "Notes—Report 1"). In addition, by tapping in the title area 70, the user 9 may access a menu structure of the currently active application.

The status indicator area 74 contains a plurality of icons 76 that provide information about system events and status, typically not associated with any particular active application. As seen in FIG. 7, the icons 76 may include a battery charge indicator, a display brightness control, a volume control as well as icons that pertain to the network interface(s) 55 and the ways in which the pocket computer connects to the network(s) 32, 26.

The task navigator 60, title area 70 and status indicator area 74 always remain on screen at their respective locations, unless full screen mode is commanded by depressing the hardware key 4c. In such a case, the currently active application will use all of the display 3 and the areas 60 and 70 will thus be hidden.

The task navigator 60 has an upper portion 62 and a lower portion 66. The upper portion 62 contains icons 63-65 which when selected will open a task-oriented, context-specific menu to the right of the selected icon. The context-specific menu will contain a plurality of task-oriented menu items, and the user 9 may navigate among these menu items and select a desired one either by the navigation key 5a or by pointing at the display screen 3. As seen in FIG. 7, the lower portion 66 represents an application switcher panel with respective icons 67 for each of a plurality of launched applications.

In FIG. 8, a text handling application in the form of a notes application is active, as indicated at 72 in the title area 70, and has control of the application area 80 of the display screen layout 100. The application area is divided into a text input field 102 and a virtual keyboard 110. Currently, there is no text input shown in the text input field 102.

The virtual keyboard 110 is divided into four main groups of logical keys or buttons 120, 130, 140 and 150. Each such key has an activation area delimited by borders 153 which is indicated as a grey box having a icon or symbol representing the meaning of the key in question. In a well known manner, by pointing with the stylus 9c within the activation area, the user 9 may select the key. Alternatively or additionally, text input may be performed e.g. by handwriting with the stylus within the text input field 102.

If the selected key is an alphanumeric key included in a character key group 130 or numeric key group 140, such as a 'd' key 152, the corresponding alphanumeric character will be directly displayed in the text input field 102, as is well known per se. If, on the other hand, the selected key belongs to a control key group 120 or 150, a corresponding function will instead be performed, such as backspace, carriage return, tabulation, switch of character set, caps lock, etc.

Figure 9A:
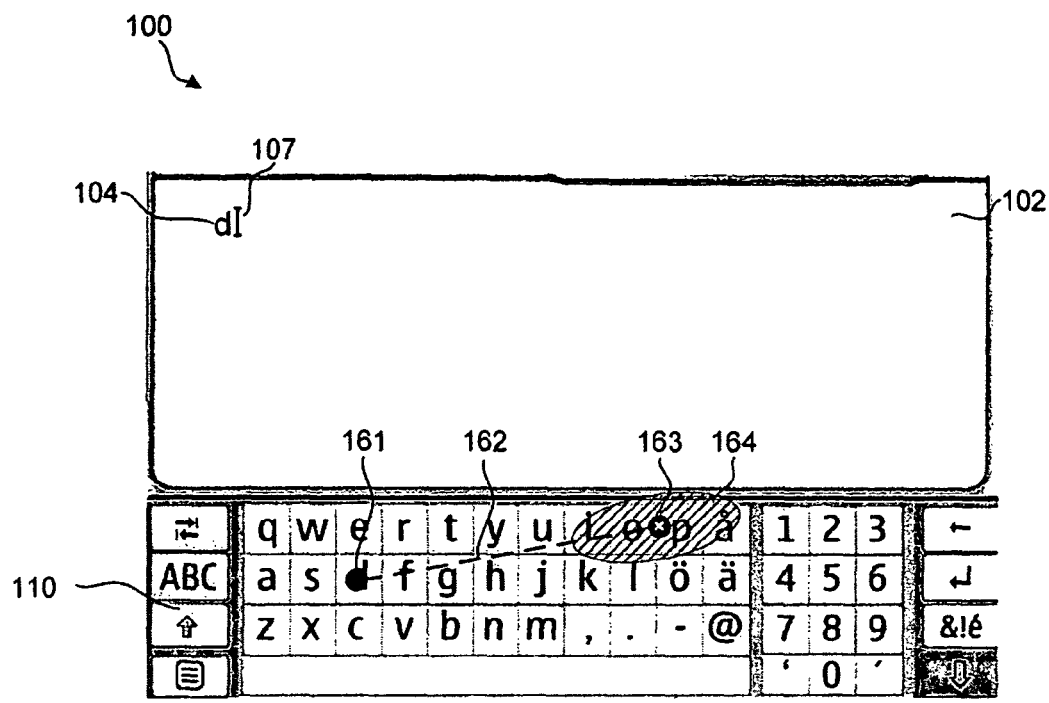
FIGS. 9a and 9b are display screen snapshots that illustrate the intelligent character selection functionality according to one embodiment.
Figure 9B:
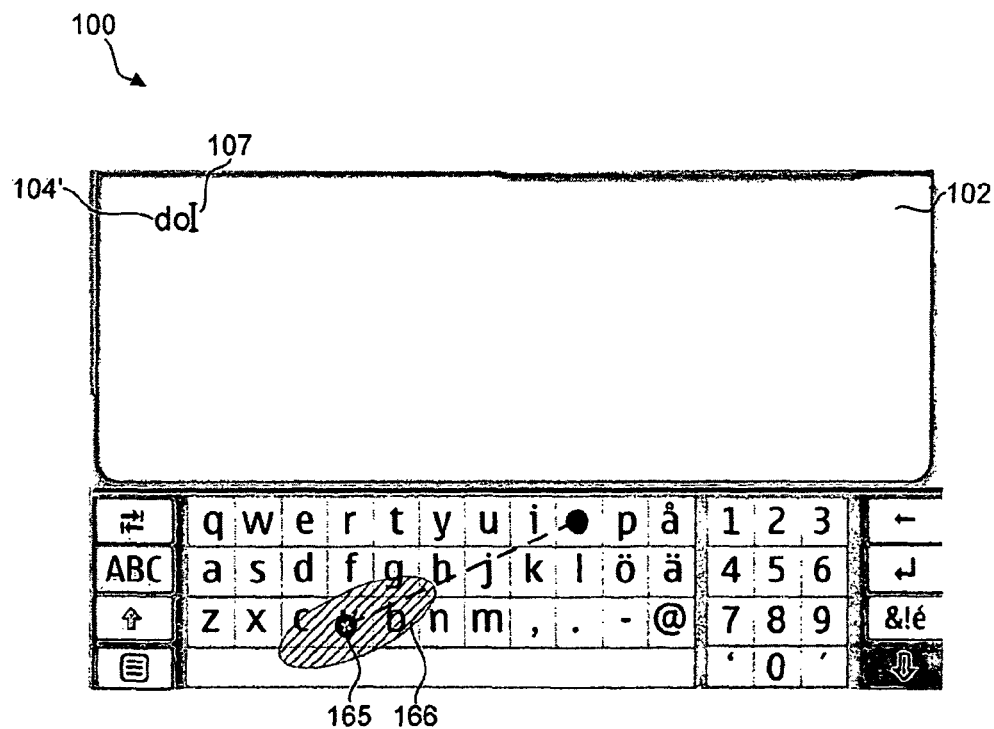

Referring now to FIGS. 9a and 9b, the virtual keyboard module 56 with its intelligent character selection functionality will be described in more detail.

The intelligent character selection is based on a method for automatically favoring likely characters in an input language when entering text by means of a virtual keyboard, while still allowing for the input of any type of text. Both language character frequency and human hand movement patterns are taken into account.

To illustrate the method, an example where the user 9 wishes to input the text 'dove' will now be described in detail.

In FIG. 9a, the user 9 has pressed stylus 9c on the screen at the position 161 for the letter 'd'. Accordingly, in the text input field 102, the text 104 'd' is displayed. A cursor 107 indicates the position for subsequent text entry. To input the next letter, 'o', the user 9 then lifts and moves the stylus along a path 162, and presses down the stylus at a new position 163. In the attempt to input text with a high speed, the user actually misses the intended letter and the new position of the stylus is just on the other side of the border 153 (see FIG. 8) within the activation area associated with the letter 'p', which is to the right of the letter 'o'. This type of mistake is unfortunate, but easy to make in this type of text entry. With virtual keyboards in the prior art, the letter 'p' would have been registered, requiring the user 9 to recognize that the incorrect letter has been entered, and to correct the entry by erasing the incorrect entry and entering the correct letter. However, in this embodiment of the present invention, the intended letter, 'o', would still be recognized.

The method works as follows:

The distance and angle between the new position 163 and the previous position 161 is calculated and a candidate area 164 is calculated.

The characters that fall sufficiently inside the candidate area 164 will be added to a candidate list of characters to be considered. Sufficiently inside can for example be that the center position of the character is inside the candidate area 164, or that a certain percentage of the character area is within the candidate area 164. The candidate area 164 is longer along an axis of movement 162, such as the depicted elliptical shape of the candidate area 164, or rectangular. One shape that has proven useful is a teardrop shape. The shape is longer along the axis of movement 162 due to there being a larger probability of missing the intended character along the axis of movement 162. In this example, for simplicity and clarity of the description, only characters 'o' and 'p' make up the candidate list.

For each of the characters in the candidate list, a probability that the character would appear after the previous character/phrase/part of word is retrieved from memory, such as memory 54 in FIG. 5. In this example, using English, the probability of an 'o' appearing after a 'd' may for example be 0.1, and the probability of a 'p' appearing after a 'd' may for example be 0.001. The probabilities are based on language statistics, and may be based on the previous character, on two previously entered characters, on all previously entered characters in the same word, etc. It is to be noted that the values of the probabilities mentioned here are mere illustrative examples. If the probability is based on one or two previous characters, this requires significantly less data to be stored in memory 54 than if a full dictionary would have to be stored. Consequently, the pocket computer 1 may support many more languages in a specific amount of memory.

Furthermore, for each character in the candidate list, the distance from the current stylus position and the center point of the character is determined. In this example, the distance from the new position 163 to the center of character 'o' is 2.8 millimeters, while the distance from the new position 163 to the center of the character 'p' is 2.6 millimeters. Distance is typically measured in geometrical distance, not in pixels, as pixels are not necessarily perfectly square.

Then a weighted distance is calculated for each character in the candidate list. The weighted distance is based on the actual, or raw, distance and the probability of each character. One formula that may be used to calculate the weighted distance is as follows:

$$D_w = (1-p) * D_r \qquad (1)$$

where $D_w$ is the weighted distance, p is the probability and $D_r$ is the raw distance. With the formula (1), the weighted distances $D_w$ for 'o' and 'p', equates to 2.520 and 2.597, respectively (rounded off to three decimals). The character with the lowest weighted distance in the calculation will be initially indicated to be pressed down. Selection of this candidate is done by lifting up the stylus, as is usual. In this example, when the user 9 lifts the stylus, 'o' is therefore selected as the next character, since 'o' has the smallest weighted distance, even though the new position is within the area for 'p'.

If the indicated candidate was not the character intended by the user 9, the user 9 can keep the stylus pressed down, for a short delay (e.g. about 0.8 seconds), whereby the target will move to the exact point where the stylus is pressed down. Alternatively or additionally, the user 9 corrected selection can be made by the user 9 moving the stylus/finger slightly while pressing down, whereby the current position of the stylus/finger should be used instead of the predicted candidate. In other words, exact input can be performed in an input style where the user 9 moves the stylus ever so slightly with each down press, for the pocket computer to consider the position by itself without considering probabilities. With these methods, the user 9 can still enter text where the letters are not the most probable letters, which in particular may be the case for passwords, web addresses, text input in a language different from the input language, etc.

FIG. 9b illustrates how the user 9 continues to type, pressing the stylus at a new position 165 to type the letter 'v'. The text input field 102 now shows the previously entered text 104' 'do', with the cursor 107 positioned after this text 104'. This time, the new position 165 is more accurate, and with no characters within the candidate zone 166 having a probability being much higher than 'v'succeeding 'o', the letter 'v' is selected. The user 9 then continues in the same manner to input 'e' to make up the intended word 'dove' (not shown).

The invention has mainly been described above with reference to a few embodiments. However, as is readily appreciated by a person skilled in the art, other embodiments than those disclosed above are equally possible within the scope of the invention, as defined by the appended patent claims.

What is claimed is:

1. A text input method for an electronic apparatus with a touch sensitive display, wherein a virtual keyboard is displayed on said display so as to facilitate input of an intended character for a user by touching keys of said virtual keyboard with a pointer, wherein the method comprises:
   detecting a touch of a first key on the touch sensitive display at a first position;
   defining a candidate area that has a configuration that is dependent upon a tap direction that extends between the first position and a second position, wherein the second position is a position of a previously detected touch of a second key of the touch sensitive display, and wherein said candidate area being relatively longer along a first axis and relatively shorter along a second axis, said first axis being parallel to said tap direction and said second axis being perpendicular to said first axis; and determining said intended character by considering:

a plurality of candidate characters disposed at least partially within the candidate area, said plurality of candidate characters being determined with regard to a raw distance, said raw distance being a distance between said first position and a position corresponding to a character, and linguistic probabilities of each character of said plurality of candidate characters being an intended character.

2. The text input method according to claim 1, wherein each key is associated with a respective key area, said method comprising:

calculating a tap distance and the tap direction between said first position and a second position, associating a candidate area with said first position, the candidate area having a predetermined spatial extent, creating a candidate list of characters, each character in said candidate list having at least part of its respective key area overlapping at least part of said candidate area, for said each character in said candidate list, determining said raw distance between a position corresponding to said each character and said first position, determining a probability value p for said each character in said candidate list, said probability value being said linguistic probability of said each character, for said each character in said candidate list, calculating a weighted distance, said weighted distance being calculated using said raw distance and said probability value, and determining said intended character, said intended character being determined as the character in said candidate list with a smallest weighted distance.

3. The method according to claim 2, wherein said step of determining a probability value involves determining a probability value based on at least one previously input character.

4. The method according to claim 2, wherein said step of determining a probability value involves determining a probability value based on at least one previously input character and an input language.

5. The method according to claim 2, wherein said step of associating a candidate area with said first position involves determining said candidate area with consideration to said tap distance and said tap direction.

6. The method according to claim 2, wherein said step of associating a candidate area with said first position involves determining said candidate area.

7. The method according to claim 1, wherein said candidate area is of an elliptical shape.

8. The method according to claim 1, wherein said candidate area is of a teardrop shape.

9. The method according to claim 2, wherein said step of for said each character in said candidate list, calculating a weighted distance, said weighted distance is proportional to both said raw distance and (1−p).

10. The method according to claim 2, wherein said step of detecting a touch on said touch sensitive display at said first position involves detecting a duration of said touch, and said method comprises the further step, after said step of determining an intended character, of:

conditionally determining said intended character to be a character directly corresponding to said first position, said condition comprising at least that said touch has a duration being longer than a threshold duration.

11. An electronic apparatus comprising a user interface with a touch sensitive display, and a controller coupled to said display, said user interface including a virtual keyboard which is presentable on said display so as to facilitate input of an intended character for a user by touching keys of said virtual keyboard with a pointer, each key being associated with a respective key area, said user interface including a character selection functionality for determining an intended character, said controller being configured to:

detect a touch on a first key of the touch sensitive display at a first position;

define a candidate area that has a configuration that is dependent upon a tap direction that extends between the first position and a second position, wherein the second position is a position of a previously detected touch of a second key of the touch sensitive display and wherein said candidate area being relatively longer along a first axis and relatively shorter along a second axis, said first axis being parallel to said tap direction and said second axis being perpendicular to said first axis; and determine said intended character by considering:

a plurality of candidate characters disposed at least partially within the candidate area, said plurality of candidate characters being determined with regard to a raw distance, said raw distance being a distance between said first position and a position corresponding to a character, and linguistic probabilities of each character of said plurality of candidate characters being an intended character.

12. The electronic apparatus according to claim 11, in the form of a pocket computer.

13. The electronic apparatus according to claim 11, in the form of a mobile terminal for a mobile telecommunications network.

14. An apparatus comprising a memory of a processor and program code stored in the memory and configured to perform the method as defined in claim 1 when executed by said processor.

15. The electronic apparatus according to claim 11, wherein said candidate area is an elliptical shape or a teardrop shape.

16. An apparatus comprising a controller and a memory storing executable instructions that in response to execution by the controller cause the apparatus to at least perform the following:

detect a touch of a first key on a touch sensitive display at a first position;

define a candidate area that has a configuration that is dependent upon a tap direction that extends between the first position and a second position, wherein the second position is a position of a previously detected touch of a second key of the touch sensitive display and wherein said candidate area being relatively longer along a first axis and relatively shorter along a second axis, said first axis being parallel to said tap direction and said second axis being perpendicular to said first axis; and determine said intended character by considering:

a plurality of candidate characters disposed at least partially within the candidate area, said plurality of candidate characters being determined with regard to a raw distance, said raw distance being a distance between said first position and a position corresponding to a character, and linguistic probabilities of each character of said plurality of candidate characters being an intended character.

17. The electronic apparatus according to claim 16, wherein said candidate area is an elliptical shape or a teardrop shape.

* * * * *